United States Patent
Massaguer et al.

(10) Patent No.: US 10,931,504 B2
(45) Date of Patent: Feb. 23, 2021

(54) ABSTRACTION LAYER FOR STREAMING DATA SOURCES

(71) Applicant: Amazon Technologies, Inc., Seattle, WA (US)

(72) Inventors: Daniel Massaguer, Herndon, VA (US); Upendra Bhalchandra Shevade, Herndon, VA (US)

(73) Assignee: Amazon Technologies, Inc., Seattle, WA (US)

(*) Notice: Subject to any disclaimer, the term of this patent is extended or adjusted under 35 U.S.C. 154(b) by 845 days.

(21) Appl. No.: 15/627,327

(22) Filed: Jun. 19, 2017

(65) Prior Publication Data

US 2017/0288939 A1 Oct. 5, 2017

Related U.S. Application Data

(63) Continuation of application No. 13/909,285, filed on Jun. 4, 2013, now Pat. No. 9,686,118.

(51) Int. Cl.
*G06F 15/173* (2006.01)
*H04L 29/06* (2006.01)
*G06F 16/2455* (2019.01)

(52) U.S. Cl.
CPC .. *H04L 29/06517* (2013.01); *G06F 16/24568* (2019.01)

(58) Field of Classification Search
CPC ............ H04L 29/06517; G06F 16/24568
See application file for complete search history.

(56) References Cited

U.S. PATENT DOCUMENTS

| | | | |
|---|---|---|---|
| 9,686,118 B1 | 6/2017 | Massaguer et al. | |
| 2008/0316919 A1* | 12/2008 | Shi .................. | H04L 12/437 370/223 |
| 2010/0241619 A1* | 9/2010 | Snider ............... | G06F 11/1453 707/693 |
| 2010/0241629 A1* | 9/2010 | Tatemura .......... | G06F 17/30557 707/741 |
| 2011/0246448 A1* | 10/2011 | Tatemura .......... | G06F 17/30436 707/714 |
| 2012/0078974 A1 | 3/2012 | Meijer | |
| 2012/0109935 A1 | 5/2012 | Meijer | |
| 2012/0110004 A1 | 5/2012 | Meijer | |
| 2013/0103729 A1* | 4/2013 | Cooney ............. | G06F 17/30126 707/831 |

(Continued)

OTHER PUBLICATIONS

Daniel Massaguer, "A Semantic Approach for Building Sentient Spaces," Doctoral Dissertation, University of California—Irvine, Oct. 2009. pp. 1-133.

(Continued)

*Primary Examiner* — Thanh T Nguyen
(74) *Attorney, Agent, or Firm* — Robert C. Kowert; Kowert, Hood, Munyon, Rankin & Goetzel, P.C.

(57) ABSTRACT

Methods and systems for implementing an abstraction layer for streaming data sources are disclosed. A request to perform an operation based on one or more keys is received using a key-value interface. A streaming data source is selected based on the request. The operation is performed using the streaming data source, wherein the operation comprises storing or retrieving one or more values based on the one or more keys.

20 Claims, 7 Drawing Sheets

(56) References Cited

U.S. PATENT DOCUMENTS

2014/0310499 A1\* 10/2014 Sundararaman .... G06F 12/0269
    711/203
2016/0070652 A1\* 3/2016 Sundararaman ...... G06F 3/0619
    711/154

OTHER PUBLICATIONS

"Amazon DynamoDB (beta)" Whitepaper downloaded from the Internet aws.amazon.com/dynamodb/; on Jul. 2, 2012, Amazon Web Services LLC pp. 1-8.
"Amazon SimpleDB (beta)" Whitepaper downloaded from the Internet aws.amazon.com/simpledb/; on Jul. 2, 2012, Amazon Web Services LLC pp. 1-7.

\* cited by examiner

ABSTRACTION LAYER FOR STREAMING DATA SOURCES

This application is a continuation of U.S. patent application Ser. No. 13/909,285, filed Jun. 4, 2013, now U.S. Pat. No. 9,686,118, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Distributed systems may include various types of entities that generate and/or store data, such as traditional relational databases and non-relational databases as well as entities that generate streams of data. Consumers of data may seek to obtain data from any of these types of data sources, and each type of data source may have its own distinct interface.

Relational database management systems (RDBMS) have been in wide use for decades. Relational databases have a number of characteristics that have led to their widespread adoption, especially for transaction processing systems. Such characteristics include support for the properties of atomicity, consistency, isolation, and durability (i.e., ACID), as well as the backing of well-established vendors with a vast knowledge base and sophisticated tool sets. A common technique for accessing and manipulating RDBMS data is to use SQL (Structured Query Language), a special-purpose programming language designed for relational database systems. In an RDBMS, data is represented in the form of relational tables in which each row has the same set of columns.

More recently, the rate of data acquisition from such sources as web server logs or sensors has grown rapidly and exposed scalability problems of relational databases. Accordingly, a number of non-relational approaches to data management have gradually gained popularity. Some of these approaches are collectively referred to as "NoSQL" databases, as they typically do not rely on SQL as their query language. Instead of using SQL, different non-relational database vendors have tended to use custom languages and interfaces. Many non-relational database systems typically promise excellent write performance as well as distributed and fault-tolerant architectures designed to overcome some of the perceived shortfalls of traditional RDBMSs. These benefits are often achieved at the cost of relaxing some of the ACID constraints that are more strictly enforced by RDBMSs.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing an abstraction layer for streaming data sources are described. Using the systems and methods described herein, applications may use the same abstraction layer to interact with heterogeneous data sources. The heterogeneous data sources may include, for example, streaming data sources as well as non-streaming, non-relational data stores (e.g., data stores that are organized based on a key-value paradigm, such as some NoSQL data stores). The abstraction layer may permit applications to request key-value operations involving the heterogeneous data sources as if all of the sources were a single NoSQL data store. In this manner, applications may store and retrieve data using streaming data sources in substantially the same manner as the applications would store and retrieve data using a NoSQL data store. The abstraction layer may hide some details of the interactions with the data sources from the applications, and the programming of the applications may thus be simplified.

Figure 1:
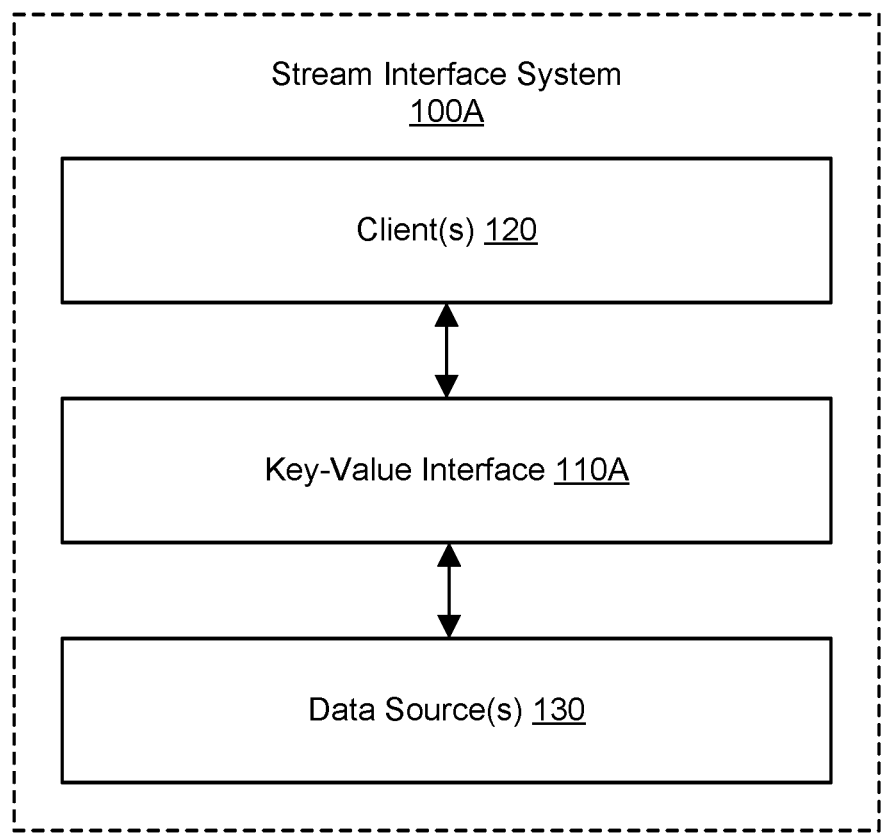
FIG. 1 illustrates an example system environment for an abstraction layer for streaming data sources, according to some embodiments.

FIG. 1 illustrates an example system environment for an abstraction layer for streaming data sources, according to some embodiments. The example system environment may include a stream interface system 100A. The stream interface system 100A may include any suitable components that implement an interface between one or more clients 120 and one or more data sources 130. For example, the stream interface system 100A may include a key-value interface 110A. The key-value interface 110A may permit the client(s) 120 to request operations based on key-value pairs, such as "put" operations to store a specified value for a specified key and "get" operations to retrieve a value for a specified key. The key-value interface 110A may permit clients 120 (e.g., applications) to interact with a plurality of heterogeneous data sources 130 using similar requests. By using the key-value interface 110A, application programmers may design, build, and test applications as if all the data in multiple underlying data sources is stored in a centralized data store and in a standardized format. The key-value interface 110A is described in further detail below.

Figure 7:
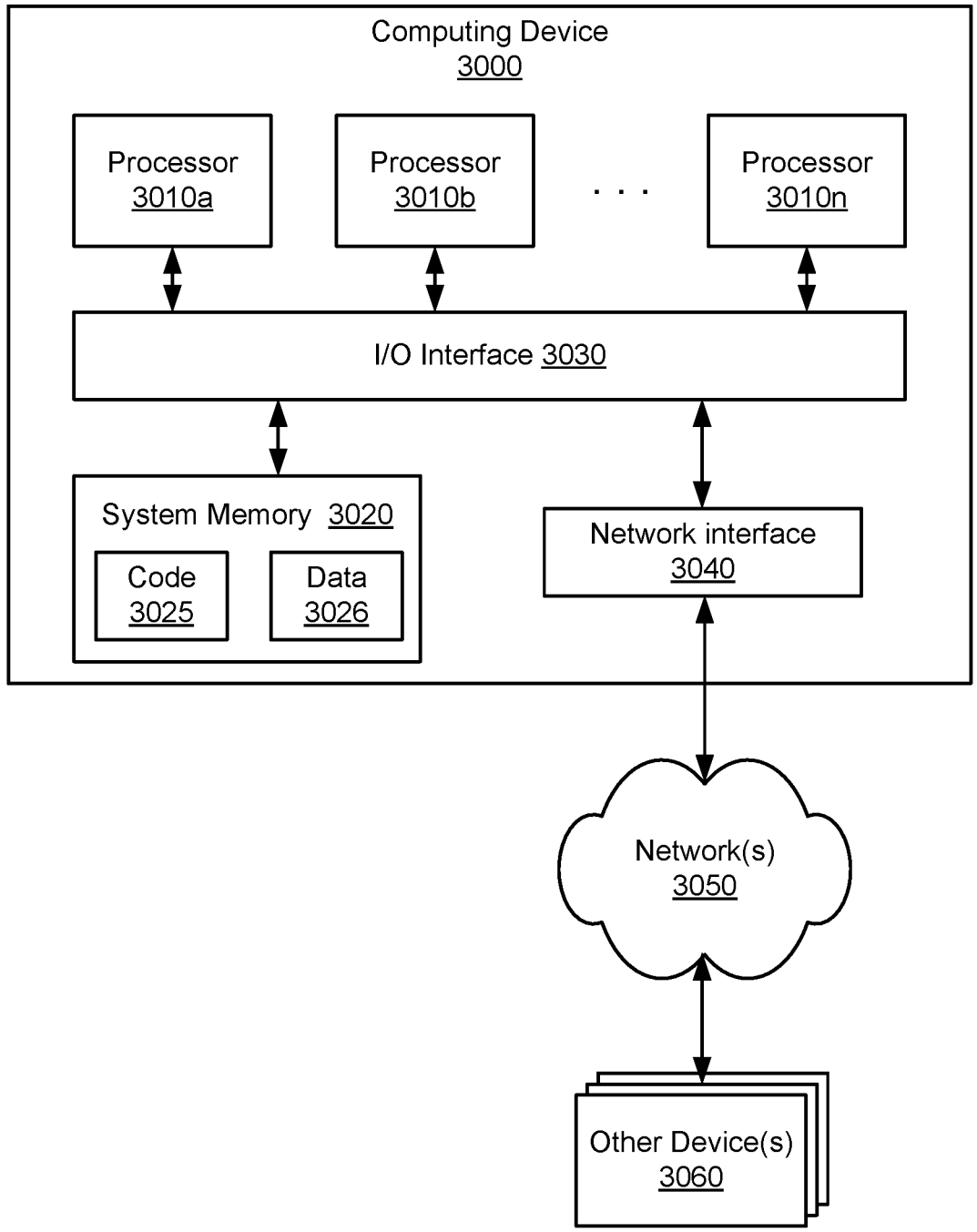
FIG. 7 illustrates an example of a computing device that may be used in some embodiments.

The stream interface system 100A may comprise one or more computing devices, any of which may be implemented by the example computing device 3000 illustrated in FIG. 7. In various embodiments, the functionality of the different services, components, and/or modules of the stream interface system 100A may be provided by the same computing device or by different computing devices. If any of the various components are implemented using different computing devices, then the respective computing devices may be communicatively coupled, e.g., via a network. Each of the components (e.g., the key-value interface 110A) may represent any combination of software and hardware usable to perform their respective functions, as discussed as follows.

Figure 2:
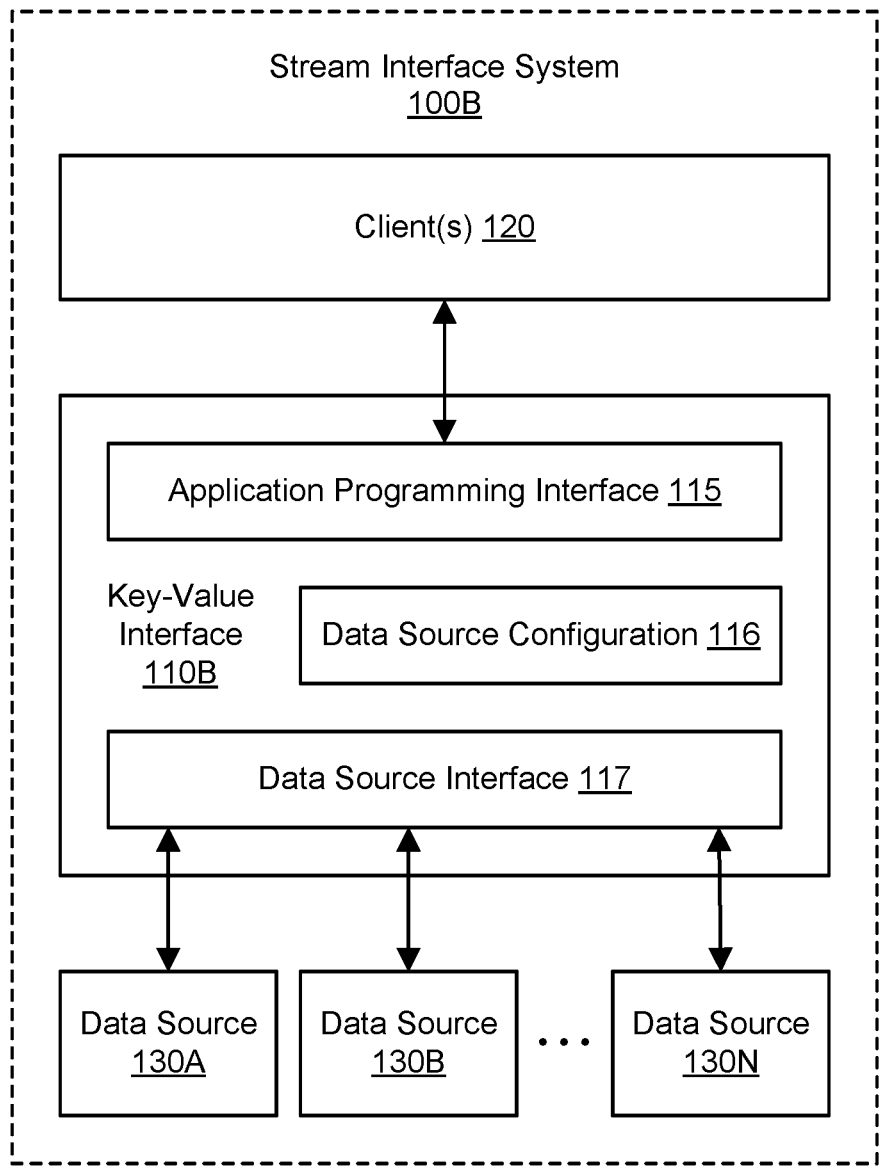
FIG. 2 illustrates an example system environment for an abstraction layer for streaming data sources, including an application programming interface, according to some embodiments.

FIG. 2 illustrates an example system environment for an abstraction layer for streaming data sources, including an application programming interface, according to some embodiments. The stream interface system 100B may be implemented in a similar manner as the stream interface system 100A discussed above with respect to FIG. 1. Similarly, the key-value interface 110B may implement similar functionality as discussed above with respect to FIG. 1. The key-value interface 110B may include various components. In one embodiment, the key-value interface 110B may include an application programming interface (API) 115. The API 115 may be implemented as a library of functions or methods that, when called, permit clients 120 (e.g., applications) to interact with the key-value interface 110B. Accordingly, the clients 120 may be programmed to invoke portions of the API 115 in order to utilize the key-value interface 110B. For example, the API 115 may provide functions that permit clients 120 to request put operations and/or get operations for various data sources 130.

In one embodiment, an application (e.g., one of the clients 120) that uses the key-value interface 110B may be modeled like an application that uses a NoSQL database based on a key-value paradigm: e.g., the application may use a data model based on a set of tables in a key-value store, and the application may employ business logic that includes inserting items into the tables and requesting items from the tables. For example, a server monitoring application that is modeled in this manner may store and read aggregates of the form (serverId, resourceId, timestamp, resourceLoad).

In one embodiment, the API 115 may support operations such as GetItem and PutItem. The GetItem operation may return a set of attributes for the item with the given primary key; if there is no matching item, GetItem may not return any data. The PutItem operation may create a new item or replace an old item with a new item; if an item already exists in the specified table with the same primary key, the new item may completely replace the existing item. Additionally, the PutItem operation may be used to perform a conditional put (e.g., to insert a new item if one with the specified primary key does not exist) or to replace an existing item if it has certain attribute values.

A plurality of data sources 130A, 130B, and 130N are shown in FIG. 2 for purposes of illustration. However, it is contemplated that different numbers of data sources may be used with the stream interface system 100B. The plurality of data sources 130A, 130B, and 130N may be of different types. Examples of different types of data sources are discussed below with respect to FIG. 3. For each of the different types of data sources, the API 115 may provide a substantially similar interface to clients 120. In this manner, clients need only be programmed with the single API 115 in order to interact in a similar manner with a plurality of heterogeneous data sources.

In one embodiment, the key-value interface 110B may include or otherwise access data source configuration functionality 116. The data source configuration functionality 116 may store information about various data sources (e.g., data sources 130A, 130B, 130N) that are configured to be controlled using the key-value interface 110B. For example, the configuration information stored for a particular data source may include the type of data source (e.g., a streaming data source, a NoSQL data store, etc.), any data format and/or metadata format required for communication with the data source (e.g., for storing data in the data source and/or retrieving data from the data source), and/or any other suitable data or metadata that may be used in providing an interface between the client(s) 120 and the data sources. The data source configuration 116 may provide a mapping between data stores specified by clients in requests and actual data sources available to serve the requests. In one embodiment, portions of the configuration information may be specified by a user when a particular data source is added to the stream interface system 100B. In one embodiment, portions of the configuration information may be discovered automatically by the key-value interface 110B, e.g., by inspection of the corresponding data source.

The key-value interface 110B may also include a data source interface 117. The data source interface 117 may permit communication between the key-value interface 110B and the various data sources (e.g., data sources 130A, 130B, 130N). In one embodiment, the data source interface 117 may use the configuration information stored for each data source in the data source configuration 116 to properly format messages sent to a data source as well as understand messages received from a data source. In one embodiment, the data source interface 117 may include additional logic to determine how to answer requests using one or more data sources, such as by connecting to a specific uniform resource identifier (URI), by configuring a pipeline with a particular arrangement of nodes, etc.

Figure 3:
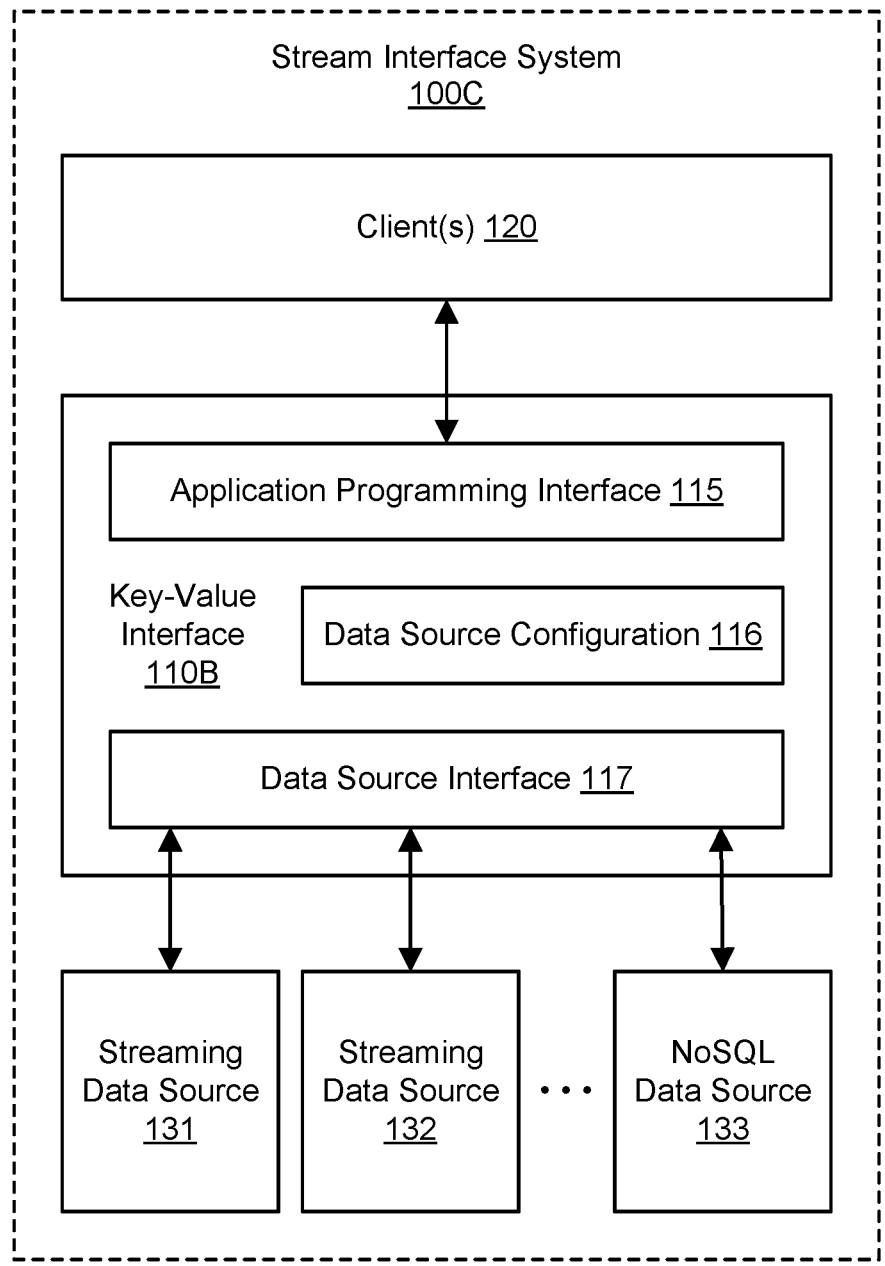
FIG. 3 illustrates an example system environment for an abstraction layer for a plurality of heterogeneous data sources, according to some embodiments.

FIG. 3 illustrates an example system environment for an abstraction layer for a plurality of heterogeneous data sources, according to some embodiments. The stream interface system 100C may be implemented in a similar manner as the stream interface system 100A discussed above with respect to FIG. 1 and/or the stream interface system 100B discussed above with respect to FIG. 2. As discussed above, the plurality of data sources associated with the stream interface system 100C may be of different types. For each of the different types of data sources, the API 115 may provide a substantially similar interface to clients 120. In this manner, clients need only be programmed with the single API 115 in order to interact with a plurality of heterogeneous data sources. As shown in the example of FIG. 3, the stream interface system 100C may include heterogeneous data sources such as a streaming data source 131, another streaming data source 132, and a NoSQL data source 133. However, it is contemplated that different numbers and types of data sources may be used with the stream interface system 100C.

In one embodiment, a streaming data source (e.g., data source 131 or 132) may generate a stream of data. The stream may include different elements of data produced at different times; however, the individual elements of data generated by a particular stream may often be similar to one another in type and/or format. A stream may produce data continuously on a regular, predictable basis or on an irregular, sporadic basis. Examples of streaming data sources include sources that produce updates for constantly changing information such as information from financial markets, weather information, web logs, system metrics, etc. A stream may be produced by a single component or by a plurality of components acting in concert (e.g., a plurality of nodes in a pipeline).

In one embodiment, in contrast to a streaming data source, the NoSQL data source 133 may store data persistently in one or more tables. The NoSQL data source 133 may support get and put operations on a single key and on a range of keys. The NoSQL data source 133 may support the use of secondary indexes. The NoSQL data source 133 may support optimistic locking for write consistency so that writes are not lost. Unlike relational database systems, which typically require all the rows within the same table to have the same columns, different objects stored within a NoSQL equivalent of a table may have different columns or attribute types, and new columns may be created easily and efficiently on demand. In some embodiments, NoSQL data sources may offer benefits such as built-in fault tolerance, flexible horizontal scaling across multiple execution platforms, and/or automated data partitioning across multiple storage devices to help support load balancing.

Figure 4:
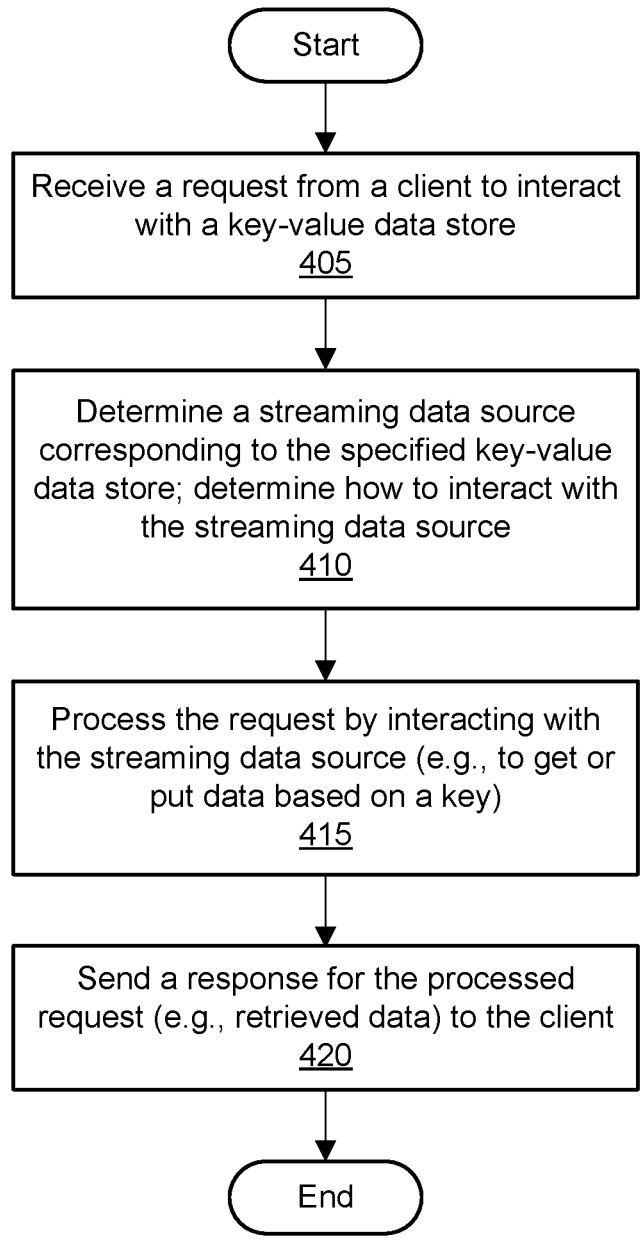
FIG. 4 is a flowchart illustrating a method for implementing an abstraction layer for streaming data sources, according to some embodiments.

FIG. 4 is a flowchart illustrating a method for implementing an abstraction layer for streaming data sources, according to some embodiments. As shown in 405, a request may be received from a client (e.g., an application, module, or other component) to interact with a key-value data store. In other words, the request may treat the underlying data source as a data store that is organized according to a key-value paradigm. The request may include a specified operation along with one or more keys and, optionally, one or more values. For example, a put operation may include one or more key-value pairs to be stored, while a get operation may include one or more keys whose values are sought to be retrieved. In one embodiment, the request may be received from the client at an abstraction layer using an API invoked by the client.

As shown in 410, the abstraction layer may determine or select a data source corresponding to the key-value data store specified in the request. In one embodiment, the selected data source may be a streaming data source (e.g., a data source that generates a stream of data). However, it is contemplated that the selected data source may instead be a NoSQL data store or any other type of data source that can process requests expressed in a key-value paradigm. To identify the data source, the abstraction layer may refer to any configuration information for the selected data source. Using the configuration information, the abstraction layer may also determine how to interact with the selected data source, e.g., how to format a request in a manner that can be understood by the selected data source.

As shown in 415, the request may be processed by the abstraction layer interacting with the selected data source. For example, to process a put request, the abstraction layer may send a request to the selected data source to store one or more values associated respectively with one or more keys. To process a get request, the abstraction layer may send a request to the selected data source to retrieve one or more values associated respectively with one or more keys. The operation performed by the data source may generate results (e.g., the retrieved values) that may be returned to the abstraction layer. As shown in 420, a response for the processed request may be returned to the client. In one embodiment, the response may be sent to the client using the same API used by the client to invoke the operation.

Figure 5:
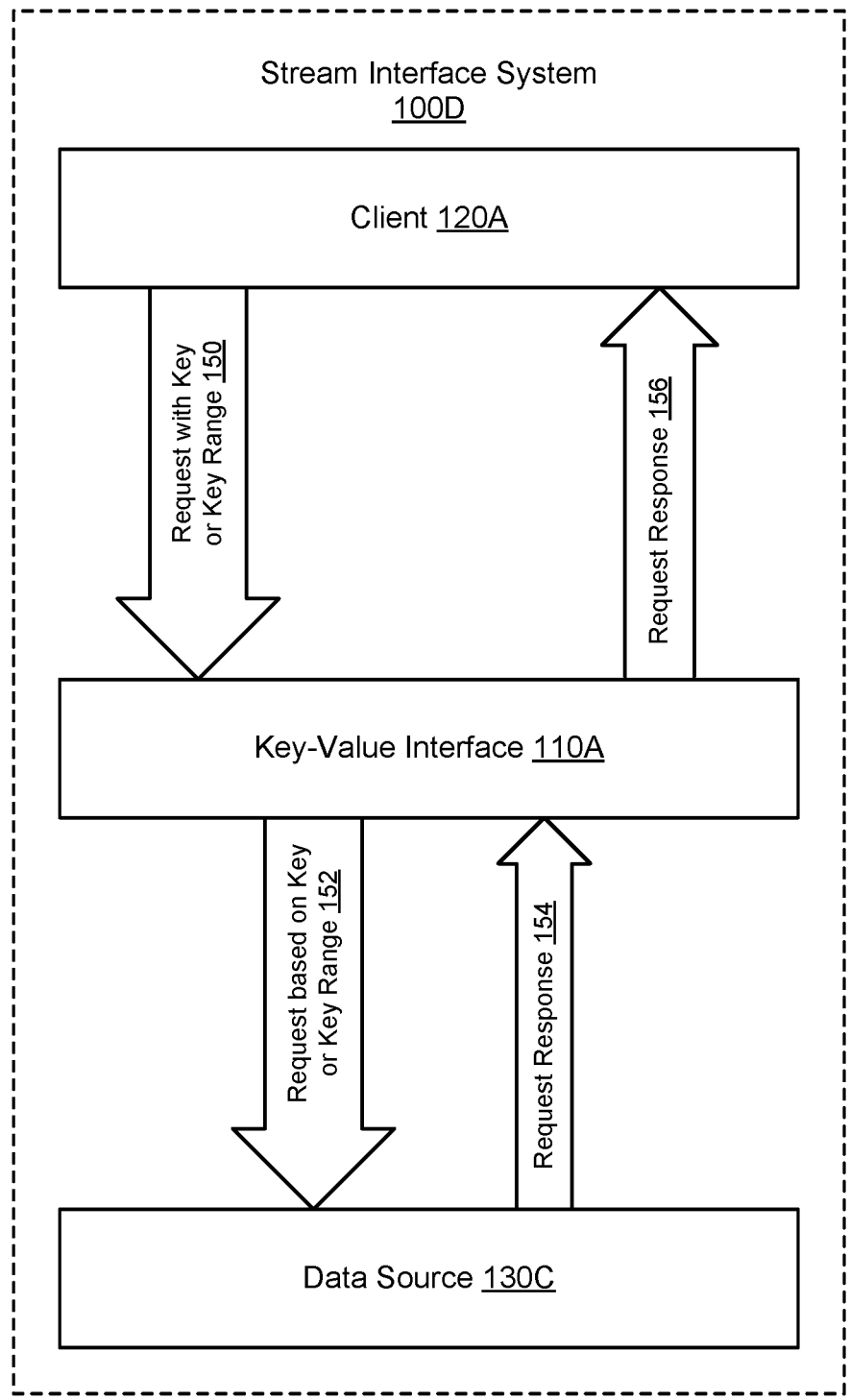
FIG. 5 illustrates an example system environment for processing one-time requests using an abstraction layer for streaming data sources, according to some embodiments.

FIG. 5 illustrates an example system environment for processing one-time requests using an abstraction layer for streaming data sources, according to some embodiments. The stream interface system 100D may be implemented in a similar manner as the stream interface system 100A discussed above with respect to FIG. 1, the stream interface system 100B discussed above with respect to FIG. 2, and/or the stream interface system 100C discussed above with respect to FIG. 3. In one embodiment, a one-time request may generate a single set of results that may be returned to the client at a point in time or within a short window of time and not over an extended period of time. For example, a get request or a put request may be processed as a one-time request. In one embodiment, the request may specify a single key. In one embodiment, the request may specify a range of keys, e.g., all the keys between a first specified key and a last specified key.

To initiate a one-time request using the abstraction layer, a client 120A may send an appropriate request 150 with a specified key or key range to the key-value interface 110A. The request 150 may seek to perform an operation for one or more key-value pairs. As discussed above, the client 120A may invoke an appropriate function of an API 115 to send the request 150. The key-value interface 110A may optionally perform any necessary translation of the request and/or the data accompanying the request in order to format the request and/or data for the underlying data source 130C. The key-value interface 110A may the send a request 152 based on the specified key or key range to the underlying data source 130C. The data source 130C may perform the requested operation, e.g., by storing one or more values associated with the specified key or key range or by retrieving one or more values associated with the specified key or key range. The data source 130C may then send a request response 154 to the key-value interface 110A. The request response 154 may include a response code (e.g., indicating success or failure of the operation) and, for a successful get operation, any retrieved values. The key-value interface 110A may optionally perform any necessary translation of the request response and/or the data accompanying the request response in order to format the request response and/or data for the client 120A. The key-value interface 110A may then forward the request response 156 to the client 120A. Because the request is a one-time request, no further request responses may be generated by the data source 130C for the particular request.

Figure 6:
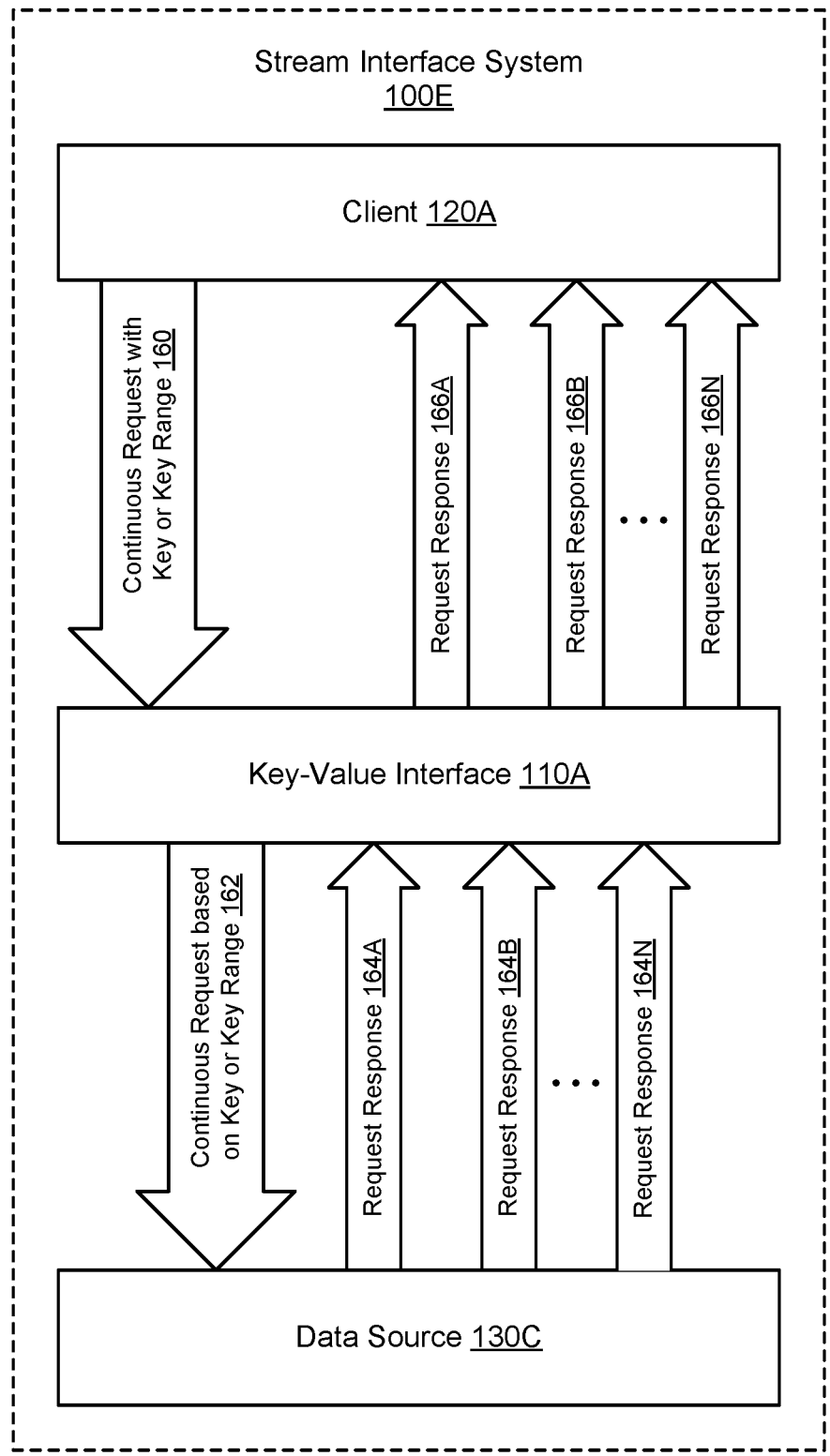
FIG. 6 illustrates an example system environment for processing continuous requests using an abstraction layer for streaming data sources, according to some embodiments.

FIG. 6 illustrates an example system environment for processing continuous requests using an abstraction layer for streaming data sources, according to some embodiments. The stream interface system 100E may be implemented in a similar manner as the stream interface system 100A discussed above with respect to FIG. 1, the stream interface system 100B discussed above with respect to FIG. 2, and/or the stream interface system 100C discussed above with respect to FIG. 3. In one embodiment, a continuous request may generate multiple results that may be returned to the client over a period of time. For example, a get request may be processed as a continuous request. A continuous request may typically be issued for a streaming data source that generates continuous updates. However, a continuous request may also be issued for a non-streaming data source (e.g., a NoSQL data store) whose relevant values are expected to change over the period of time associated with the continuous request. In one embodiment, the continuous request may specify a single key. In one embodiment, the continuous request may specify a range of keys, e.g., all the keys between a first specified key and a last specified key.

To initiate a continuous request using the abstraction layer, a client 120A may send an appropriate request 160 with a specified key or key range to the key-value interface 110A. The continuous request 160 may seek to perform an operation for one or more key-value pairs, e.g., over a predefined period of time. In one embodiment, the period of time may be specified in the continuous request 160, e.g., by specifying a time at which the operation should end. In one embodiment, the period of time may be an indefinite period with no specified ending time. In one embodiment, the continuous request 160 may also specify a regular interval at which results should be generated. As discussed above, the client 120A may invoke an appropriate function of an API 115 to send the continuous request 160. The key-value interface 110A may optionally perform any necessary translation of the continuous request and/or the data accompanying the continuous request in order to format the continuous request and/or data for the underlying data source 130C. The key-value interface 110A may the send a continuous request 162 based on the specified key or key range to the underlying data source 130C. In one embodiment, the key-value interface 110A may send the continuous request to the data source (e.g., a streaming data source) only once, and the data source may generate multiple results over time. In one embodiment, the key-value interface 110A may instead implement the continuous request by sending multiple requests to the data source (e.g., a non-relational data store), and the data source may respond once to each request.

To implement the continuous request, the data source 130C may perform the requested operation multiple times, e.g., by retrieving one or more values associated with the specified key or key range at different points in time over the duration of the period of time. For example, if the request seeks current weather information or a current stock price from a streaming data source, the streaming data source may generate the desired information at a particular interval. For each individual result or each set of results generated at a particular interval, the data source 130C may send a request response to the key-value interface 110A. As shown in the example of FIG. 6, the data source 130C may generate three or more request responses 164A, 164B, and 164N. However, it is contemplated that a data source answering a continuous request may generate more responses or fewer responses, as appropriate. Each request response 164A, 164B, and 164N may include a response code (e.g., indicating success or failure of the operation) and, for a successful get operation, any retrieved values. The key-value interface 110A may optionally perform any necessary translation of the request response and/or the data accompanying the request response in order to format the request response and/or data for the client 120A. For each request response 164A, 164B, and 164N, the key-value interface 110A may then forward a corresponding request response 166A, 166B, or 166N to the client 120A. In one embodiment, a handler may be specified along with the continuous request in order to receive and process the results over time. In one embodiment, responses may be generated and sent to the client in this manner until the continuous request expires or until processing fails.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1-6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   at least one processor; and
   a memory, storing program instructions that when executed by the at least one processor, cause the at least one processor to:
   receive a request from a client to perform a data operation, wherein the request is received using an abstraction layer comprising an interface that accepts requests according to a single data format to perform data operations at one or more of a plurality of heterogeneous data sources, wherein the plurality of heterogeneous data sources store respective data according to different respective data formats;
   identify one of the heterogeneous data sources as specified by the data request; and
   cause performance of the data operation at the identified data source according to the respective format of the identified data source.

2. The system of claim 1, wherein the data operation is an operation to retrieve one or more values of the respective data from the identified data source, and wherein the program instructions further cause the at least one processor to return the one or more values of the respective data retrieved by the performance of the data operation to the client using the abstraction layer according to the single data format.

3. The system of claim 1, wherein to cause the performance of the data operation at the identified data source according to the respective format of the identified data source, the program instructions cause the at least one processor to send a request formatted according to an interface for the identified data source to the data source to perform the data operation.

4. The system of claim 1, wherein the single data format is for a non-relational data store and wherein the identified data source is a relational data store and wherein the respective data format is a format for the relational data store.

5. The system of claim 1, wherein the identified data source is a streaming data source.

6. The system of claim 1, wherein to identify the one data source, the program instructions cause the at least one processor to evaluate a mapping between a data source specified in the request and the plurality of heterogeneous data sources to identify the one data source.

7. The system of claim 1, wherein the data operation is an operation to store one or more values of the respective data at the identified data source, and wherein to cause the performance of the data operation at the identified data source according to the respective format of the identified data source, the program instructions cause the at least one processor to store the one or more values as part of the respective data in the respective data format of the identified data source.

8. A method, comprising:
performing, by one or more computing devices:
receiving a request from a client to perform a data operation, wherein the request is received using an abstraction layer comprising an interface that accepts requests according to a single data format to perform data operations at one or more of a plurality of heterogeneous data sources, wherein the plurality of heterogeneous data sources store respective data according to different respective data formats;
identifying one of the heterogeneous data sources as specified by the data request; and
causing performance of the data operation at the identified data source according to the respective format of the identified data source.

9. The method of claim 8, wherein the data operation is an operation to retrieve one or more values of the respective data from the identified data source, and wherein the method further comprises returning the one or more values of the respective data retrieved by the performance of the data operation to the client using the abstraction layer according to the single data format.

10. The method of claim 8, wherein causing the performance of the data operation at the identified data source according to the respective format of the identified data source comprises sending a request formatted according to an interface for the identified data source to the data source to perform the data operation.

11. The method of claim 8, wherein the single data format is for a non-relational data store and wherein the identified data source is a relational data store and wherein the respective data format is a format for the relational data store.

12. The method of claim 8, wherein the identified data source is a streaming data source.

13. The method of claim 8, wherein identifying the one data source comprises evaluating a mapping between a data source specified in the request and the plurality of heterogeneous data sources to identify the one data source.

14. The method of claim 8, wherein the data operation is an operation to store one or more values of the respective data at the identified data source, and wherein causing performance of the data operation at the identified data source according to the respective format of the identified data source comprises storing the one or more values as part of the respective data in the respective data format of the identified data source.

15. A non-transitory, computer readable storage medium, storing program instructions that when executed by one or more computing devices, cause the one or more computing devices to implement:
receiving a request from a client to perform a data operation, wherein the request is received using an abstraction layer comprising an interface that accepts requests according to a single data format to perform data operations at one or more of a plurality of heterogeneous data sources, wherein the plurality of heterogeneous data sources store respective data according to different respective data formats;
identifying one of the heterogeneous data sources as specified by the data request; and
causing performance of the data operation at the identified data source according to the respective format of the identified data source.

16. The non-transitory, computer readable storage medium of claim 15, wherein the data operation is an operation to retrieve one or more values of the respective data from the identified data source, and wherein the program instructions further cause the one or more computing devices to further implement returning the one or more values of the respective data retrieved by the performance of the data operation to the client using the abstraction layer according to the single data format.

17. The non-transitory, computer readable storage medium of claim 15, wherein, in causing the performance of the data operation at the identified data source according to the respective format of the identified data source, the program instructions cause the one or more computing devices to implement sending a request formatted according to an interface for the identified data source to the data source to perform the data operation.

18. The non-transitory, computer readable storage medium of claim 15, wherein the single data format is for a non-relational data store and wherein the identified data source is a relational data store and wherein the respective data format is a format for the relational data store.

19. The non-transitory, computer readable storage medium of claim 15, wherein the identified data source is a streaming data source.

20. The non-transitory, computer readable storage medium of claim 15, wherein, in identifying the one data source, the program instructions cause the one or more computing devices to implement evaluating a mapping between a data source specified in the request and the plurality of heterogeneous data sources to identify the one data source.

* * * * *